J. NEWMANN.
BALL BEARING.
APPLICATION FILED APR. 19, 1917.

1,266,145.

Patented May 14, 1918.

Inventor
John Newmann
By his Attorney

UNITED STATES PATENT OFFICE.

JOHN NEWMANN, OF NEW YORK, N. Y.

BALL-BEARING.

1,266,145.　　　　　Specification of Letters Patent.　　Patented May 14, 1918.

Application filed April 19, 1917. Serial No. 163,115.

*To all whom it may concern:*

Be it known that I, JOHN NEWMANN, a citizen of the United States, residing in the city of New York, county of Kings, and State of New York, have invented certain new and useful Improvements in Ball-Bearings, of which the following is a specification.

The present invention relates to ball bearings, particularly of the class in which cages are employed for holding and separating the balls.

An important object of my invention is to provide cages in form of solid perforated rings and rings split into two halves, to be used separately or in conjunction with the former, and which will permit the parts to be readily assembled and securely maintained in assembled position.

A further object of my invention is to provide means, whereby the sections of the split rings can be readily joined to form a single piece after the parts are properly assembled and which can be easily removed without damaging the cage.

With these and other objects in view, my invention consists in the construction, arrangement and combination of parts as will be hereinafter fully described and set forth in the appended claims.

Figure 1:
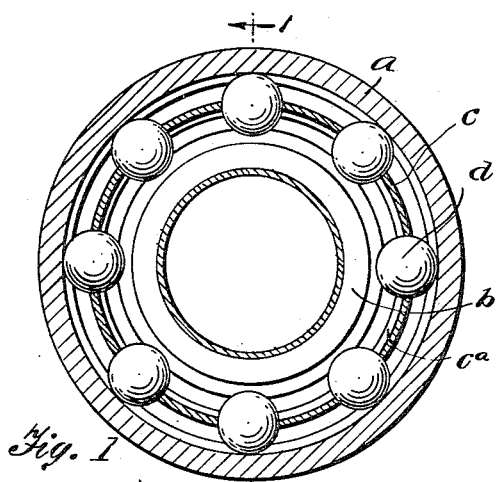
Figure 2:
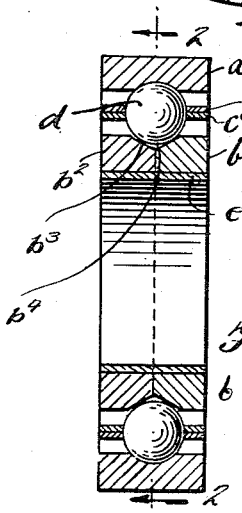
Figure 3:
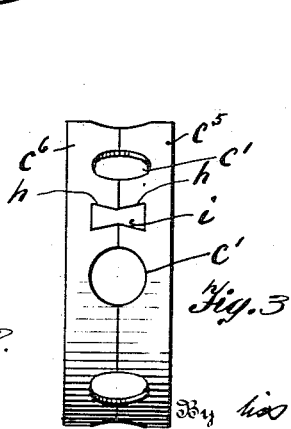
Figure 4:
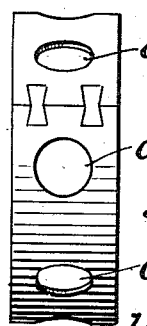

In the drawing, which forms part of this specification and in which similar reference characters denote corresponding parts, Figure 1 is a section on line 2—2 of Fig. 2, showing the use of a solid cage and a sectional cage in conjunction; Fig. 2 is a section on line 1—1 of Fig. 1 and Figs. 3 and 4 are partial plan views of modified forms of a split cage.

Referring to the drawing, $a$ denotes the outer shell, $b$ the cone, $c$ $c^a$ the cages and $d$ the balls.

The inner cone $b$ is shown composed of two annular sections $b^1$, $b^2$, each of which has a portion of its outer surface, as at $b^3$, slanting so that when the two sections are assembled or joined together, they will form together a V-shaped groove $b^4$ on their outer circumference. The outer shell in this case is provided with a spherically shaped groove $a^1$. The two sections of the cone may be joined together by a bushing $e$, to which the two sections $b^1$, $b^2$ of the inner cone are suitably fixed. The inner diameter of the cone is made somewhat larger than the outer diameter of the shaft, and is designed to accommodate the bushing $e$ which is to fit on the particular shaft. The cage $c$ consists of an annular member or ring, which on its circumference is provided with a plurality of circular perforations $c'$, the inner circumference of which is spherically shaped so as to embrace a portion of the outer hemisphere. The balls in this case can be inserted only from inside the cage and will be held in assembled position by the cone $b$. Owing to the V-shaped groove $b^4$ this ball bearing can be used when the bearing surfaces of the outer shell or cone are worn off; the bearing can be adjusted by grinding off the adjoining surfaces $b^5$, $b^6$ of the sectional cone to bring them closer together and thereby raise the bearing points for the balls or by inserting shims (not shown) between said adjoining surfaces lower said points.

The cage $c^a$ is also provided with a plurality of circular perforations, the inner circumferences of which are spherically shaped to embrace a portion of the inner hemisphere, so that the balls can be inserted only from outside the cage and will be maintained in assembled position by the sectional shell.

In order to enable the assembling of the balls within the inner shell without using the cone or around the cone without using the shell, I provide a cage which is split into two sections and which after the assembling of the balls can be joined together to form a single piece. This split cage may be used either separately or in conjunction with the heretofore described solid cage.

In the present embodiment of my invention one of the cages is split into two annular halves $c^5$, $c^6$. By using the two cages together, and only in conjunction with a solid outer shell $a$, or with a solid inner cone $b$ the balls $d$ can be assembled and will be maintained in position without the use of an inner cone. The outer shell $a$ is solid, while the inner cone is sectional. The solid cage is the outer cage and the sectional cage is the inner cage. The two cages are inserted into or made to fit snugly within and with their perforations registering with one another when assembled. The balls when properly inserted bear within the spherical groove of the outer shell and will by their engagement with the two cages be locked in position. It is clear that to assemble the balls only one half or section of the inner cage is first inserted into the outer cage and after all balls are properly positioned, the second half is inserted and the two halves are then suitably joined together. When the outer shell is sectional and the inner cone solid, their position is reversed, that is to say, the sectional cage will be the outer and the solid cage the inner one and the engagement of the balls will be made from the outside of the solid cage.

The shell or inner cone when made sectional will be shaped so as to form a V-shaped groove for the balls in order to allow the adjustment heretofore mentioned, and the two sections may be joined together as heretofore described.

An important feature of my invention is also the means whereby the two sections or halves $c^5$, $c^6$ of the split cage can be quickly joined together so as to permanently hold the assembled balls in position and which will allow of the sections being easily taken apart. In the present embodiment of my invention, in order to accomplish this, each of the sections is provided with two or more dove-tailed incisions or notches $h$ extending transversely from the inner edge of the sections. The dove-tailed notches of the two sections are adapted to coincide with one another when properly assembled so as to receive a double dove-tailed member $i$, which will snugly fit therein, locking the two sections together.

Another form of a split cage is shown in Fig. 4. Here the cage assembled to be divided is split diametrically into two halves $c^7$, $c^8$ or partly split only at one place. In this case the sections or the ends of the split cage are joined together in a similar manner, as the sections shown in Fig. 3, excepting that the dove-tailed notches $h'$ extend longitudinally instead of transversely of the cage. The cage of such construction is flexible so that it will allow the insertion and locking of the balls without using the solid cage.

By using the two cages together, shown in Figs. 1, 2 and 3, or the diametrically divided cage, shown in Fig. 4, the cage, balls with either one of the parts, to wit the solid inner cone or the solid outer shell forms a unit, which can be manufactured and kept in stock irrespective of the size of the other missing part, namely the sectional shell or sectional cone respectively. Owing to the V-shaped grooves in these sectional parts, the latter can be easily adjusted to fit the particular location of the bearing or size of the balls used, as hereinbefore explained.

Since various other modifications may be made in the construction of the ball bearing without departing from the spirit of my invention, I do not wish to limit myself to the details clearly described.

What I claim and desire to secure by Letters Patent is:

1. A ball bearing comprising an outer shell having a groove circular in cross section on its inner circumference, an annular cage having a number of perforations of circular cross section, a second annular cage having the same number of perforations of circular cross section, and split into two annular sections, a set of balls borne in the perforations of said two annular cages and in the groove of said outer shell, and means for joining the two sections of said cage together after the balls are assembled.

2. A ball bearing comprising an outer shell having an inner groove, an inner sectional cone having the outer groove, balls borne in said grooves, and two annular perforated members forming cages for said balls and adapted to snugly fit within one another, one of said cages being sectional and having the cicumference of its perforations shaped so as to embrace a portion of one hemisphere of said balls and the other being solid and having the circumference of its perforations shaped so as to embrace a portion of the other hemisphere of the balls.

3. In a ball bearing, an outer shell, balls therein, and two cages for said balls fitting one within the other and one of which is composed of two separable parts.

4. In a ball bearing, an outer shell, balls therein, and two cages for said balls fitting one within the other and of which one is composed of two annular separable sections.

5. In a ball bearing, an outer shell, balls therein, two cages for said balls, fitting one within the other and one of which is composed of two separable sections, and means for joining said sections together after the parts are assembled.

6. In a ball bearing, an outer shell, balls therein, two cages for said balls, fitting one within the other and each having perforations of circular cross section and of which the perforations of one cage engage around one hemisphere of the balls and those of the other cage engage around the opposite hemisphere of the balls.

7. In a ball bearing, the combination with balls, of two cages therefor, fitting within one another and which have perforations of circular cross section of which the perforations of one cage engage around one hemisphere of the balls and those of the other cage engage around the opposite hemisphere of the balls, one of said cages consisting of two annular sections and means for joining said annular sections together after the balls have been assembled therein.

In testimony whereof, I affix my signature in presence of two witnesses.

JOHN NEWMANN.

Witnesses:
E. D. JUNIOR,
MAX D. ORDMANN.